(12) United States Patent
Clavin et al.

(10) Patent No.: US 9,113,190 B2
(45) Date of Patent: Aug. 18, 2015

(54) CONTROLLING POWER LEVELS OF ELECTRONIC DEVICES THROUGH USER INTERACTION

(75) Inventors: John Clavin, Seattle, WA (US); John Tardif, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 326 days.

(21) Appl. No.: 12/794,406

(22) Filed: Jun. 4, 2010

(65) Prior Publication Data

US 2011/0298967 A1    Dec. 8, 2011

(51) Int. Cl.
| H04N 5/63 | (2006.01) |
| H04N 21/4223 | (2011.01) |
| H04N 21/442 | (2011.01) |
| H04N 21/422 | (2011.01) |
| H04N 21/443 | (2011.01) |
| G06F 1/32 | (2006.01) |

(52) U.S. Cl.
CPC .......... H04N 21/4223 (2013.01); G06F 1/3231 (2013.01); H04N 21/42203 (2013.01); H04N 21/4436 (2013.01); H04N 21/44218 (2013.01)

(58) Field of Classification Search
USPC .............. 348/730; 704/246; 713/323; 362/20
See application file for complete search history.

(56) References Cited

U.S. PATENT DOCUMENTS

| 5,999,766 A | 12/1999 | Hisatomi et al. |
| 6,421,453 B1 | 7/2002 | Kanevsky et al. |
| 6,615,177 B1 | 9/2003 | Rapp et al. |
| 6,622,119 B1 | 9/2003 | Ramaswamy et al. |
| 7,487,375 B2 | 2/2009 | Lourie et al. |
| 7,568,116 B2 | 7/2009 | Dooley et al. |
| 7,643,056 B2 | 1/2010 | Silsby |

(Continued)

FOREIGN PATENT DOCUMENTS

| CN | 101095055 A | 12/2007 |
| CN | 102713788 A1 | 10/2012 |

OTHER PUBLICATIONS

Grundner, Alexander, "Updated: Xbox 360 Kinect Hand Gesture Media Controls, Voice Control, TV Video Chat." eHomeUpgrade [online]. Jun. 14, 2010, [retrieved on Dec. 28, 2010] Retrieved from the internet: <URL: http://www.ehomeupgrade.com/2010/06/14/updated-xbox-360-kinect-hand-gesture-media-controls-voice-control-tv-video-chat/>, 8 pages.

(Continued)

*Primary Examiner* — Nasser Goodarzi
*Assistant Examiner* — Tariq Gbond
(74) *Attorney, Agent, or Firm* — Ladislav Kusnyer; Judy Yee; Micky Minhas

(57) ABSTRACT

A processor-implemented method, system and computer readable medium for intelligently controlling the power level of an electronic device in a multimedia system based on user intent, is provided. The method includes receiving data relating to a first user interaction with a device in a multimedia system. The method includes determining if the first user interaction corresponds to a user's intent to interact with the device. The method then includes setting a power level for the device based on the first user interaction. The method further includes receiving data relating to a second user interaction with the device. The method then includes altering the power level of the device based on the second user interaction to activate the device for the user.

16 Claims, 11 Drawing Sheets

(56) References Cited

U.S. PATENT DOCUMENTS

| | | | |
|---|---|---|---|
| 8,141,775 | B1 | 3/2012 | Aidasani et al. |
| 8,260,740 | B2 | 9/2012 | Davis et al. |
| 8,499,245 | B1 | 7/2013 | Froment et al. |
| 2001/0021994 | A1 | 9/2001 | Nash |
| 2002/0174230 | A1 | 11/2002 | Gudorf et al. |
| 2002/0178446 | A1 | 11/2002 | Sie et al. |
| 2004/0189720 | A1 | 9/2004 | Wilson et al. |
| 2004/0193413 | A1* | 9/2004 | Wilson et al. ............... 704/243 |
| 2005/0212911 | A1* | 9/2005 | Marvit et al. ............... 348/154 |
| 2006/0158307 | A1 | 7/2006 | Lee et al. |
| 2006/0161377 | A1 | 7/2006 | Rakkola et al. |
| 2006/0184800 | A1 | 8/2006 | Rosenberg |
| 2006/0271207 | A1 | 11/2006 | Shaw |
| 2006/0280055 | A1 | 12/2006 | Miller et al. |
| 2007/0140532 | A1 | 6/2007 | Goffin |
| 2007/0203685 | A1 | 8/2007 | Takano |
| 2007/0219430 | A1* | 9/2007 | Moore ............... 600/300 |
| 2008/0059578 | A1 | 3/2008 | Albertson et al. |
| 2008/0151113 | A1 | 6/2008 | Park |
| 2009/0013366 | A1 | 1/2009 | You et al. |
| 2009/0072992 | A1* | 3/2009 | Yun ............... 340/825.22 |
| 2009/0133051 | A1 | 5/2009 | Hildreth |
| 2009/0143141 | A1* | 6/2009 | Wells et al. ............... 463/37 |
| 2009/0167882 | A1* | 7/2009 | Chen et al. ............... 348/222.1 |
| 2009/0178097 | A1 | 7/2009 | Kim et al. |
| 2009/0296002 | A1 | 12/2009 | Lida et al. |
| 2009/0320055 | A1* | 12/2009 | Langille et al. ............... 725/14 |
| 2010/0007801 | A1 | 1/2010 | Cooper et al. |
| 2010/0026914 | A1 | 2/2010 | Chung et al. |
| 2010/0033427 | A1* | 2/2010 | Marks et al. ............... 345/156 |
| 2010/0095332 | A1 | 4/2010 | Gran et al. |
| 2010/0138798 | A1 | 6/2010 | Wilson et al. |
| 2010/0151946 | A1* | 6/2010 | Wilson et al. ............... 463/36 |
| 2010/0207875 | A1 | 8/2010 | Yeh |
| 2010/0235667 | A1* | 9/2010 | Mucignat et al. ............... 713/323 |
| 2010/0248832 | A1* | 9/2010 | Esaki et al. ............... 463/36 |
| 2010/0271802 | A1* | 10/2010 | Recker et al. ............... 362/20 |
| 2010/0283735 | A1* | 11/2010 | Kim et al. ............... 345/168 |
| 2010/0286983 | A1* | 11/2010 | Cho ............... 704/246 |
| 2010/0295782 | A1* | 11/2010 | Binder ............... 345/158 |
| 2010/0327766 | A1* | 12/2010 | Recker et al. ............... 315/291 |
| 2011/0026765 | A1 | 2/2011 | Ivanich et al. |
| 2011/0037866 | A1* | 2/2011 | Iwamoto ............... 348/222.1 |
| 2011/0077513 | A1* | 3/2011 | Rofougaran ............... 600/437 |
| 2011/0115887 | A1 | 5/2011 | Yoo et al. |
| 2011/0126154 | A1 | 5/2011 | Boehler et al. |
| 2011/0157009 | A1 | 6/2011 | Kim et al. |
| 2011/0242305 | A1* | 10/2011 | Peterson et al. ............... 348/77 |
| 2012/0005632 | A1 | 1/2012 | Broyles et al. |
| 2012/0030637 | A1 | 2/2012 | Dey et al. |
| 2012/0105257 | A1 | 5/2012 | Murillo et al. |

OTHER PUBLICATIONS

"HDI Dune Prime 3.0 Part 2." Jacko.MY [online]. Jun. 19, 2010, [retireved on Dec. 27, 2010] Retrieved from the Internet: <URL: http://www.jacko.my/2010/06/hdi-dune-prime-30-part-2.html>, 15 pages.

"KinEmote uses Kinect to translate key strokes for Windows applications," techshout.com [online]. Dec. 28, 2010, [retrieved on Dec. 28, 2010] Retrieved from the Internet: <URL: http://www.techshout.com/gaming/2010/28/kinemote-uses-kinect-to-translate-key-strokes-for-windows-applications/>, 2 pages.

Klompmaker, Florian, ed., "D5.1—State of the art analysis and recommendations on 'Context Awareness', 'Human Computer Interaction' and 'Mobile User Interfaces'." Information Technology for European Advancement (ITEA), Local Mobile Services. Jul. 2, 2007, [retrieved on Dec. 28, 2010] Retrieved from the Internet: <URL: http://www.loms-itea.org/deliverables/LOMS_D5.1_v1.0.pdf>, 55 pages.

Schiesel, Seth, "A Home System Leaves Hand Controls in the Dust", Kinect by Microsot Keeps You Entertained Hands Free, The New York Times [online], Nov. 4, 2010, [retrieved on Jan. 12, 2011] Retrieved from the Internet: <URL: http://www.nytimes.com/2010/11/04/arts/television/04kinect.html>, 3 pages.

Gonzalez, Barb, "HDMI CEC", Home Theater University [online], Mar. 24, 2008, [retrieved on Jan. 12, 2011] Retrieved from the Internet: <URL: http://www.hometheater.com/hookmeup/208hook>, 3 pages.

"Designing CEC into your next HDMI Product", Quantum Data White Paper, May 13, 2006, Retrieved from the Internet: <URL: http://www.quantumdata.com/pdf/CEC_white_paper.pdf>, 12 pages, Quantum Data, Inc., Elgin, IL, USA.

U.S. Appl. No. 13/039,024, filed Mar. 2, 2011.

Toyama, et al., "Probabilistic Tracking in a Metric Space," Eighth International Conference on Computer Vision, Vancouver, Canada, vol. 2, Jul. 2001, 8 pages.

Tilley, Steve, "E3 09: Project Natal exposed," [http://blogs.canoe.ca/loadthis/general/e3-09-project-natal-exposed/], Jun. 1, 2009, 4 pages.

Dalton, Angela, et al., "Sensing User Intention and Context for Energy Management," Duke University, Department of Computer Science, [http://www.cs.duke.edu/ari/millywatt/faceoff.pdf], Feb. 23, 2003, 5 pages.

First Office Action dated Sep. 2, 2013 in Chinese Patent Application No. 201110159923.8, with brief English summary, 14 pages.

Respond to Office Action filed Nov. 1, 2013 in U.S. Appl. No. 13/039,024, 9 pages.

Office Action dated May 22, 2014 in Chinese Patent Application No. 201110159923.8, with partial English translation and summary of the office action, 10 pages.

Response to Office Action filed Aug. 15, 2014 in U.S. Appl. No. 13/039,024, 11 pages.

Response to Second Office Action filed Aug. 5, 2014 in Chinese Patent Application No. 201110159923.8, with English translation of the amended Claims, 16 pages.

First Office Action dated Sep. 2, 2013 in Chinese Patent Application No. 201110159923.8, with brief English summary,14 pages.

English Abstract of CN102713788A dated Oct. 3, 2012, 3 pages.

English Abstract of CN101095055A dated Dec. 26, 2007, 1 page.

Response to Office Action filed Jan. 16, 2014 in Chinese Patent Application No. 201110159923.8, with English summary of arguments and English translation of the amended Claims, 20 pages.

Office Action dated Oct. 1, 2013 in U.S. Appl. No. 13/039,024, 9 pages.

Response to Office Action filed Nov. 1, 2013 in U.S. Appl. No. 13/039,024, 9 pages.

Office Action dated Apr. 7, 2014 in U.S. Appl. No. 13/039,024, 57 pages.

Office Action dated May 22, 2014 in Chinese Patent Application No. 201110159923.8 with partial English translation and summary of the office action, 10 pages.

Notice of Allowance dated Dec. 2, 2014, in Chinese Patent Application No. 201110159923.8 filed Jun. 3, 2011.

Office Action mailed Dec. 3, 2014, in U.S. Appl. No. 13/039,024 filed Mar. 2, 2011.

Amendment dated Feb. 26, 2015, in U.S. Appl. No. 13/039,024 filed Mar. 2, 2011.

* cited by examiner

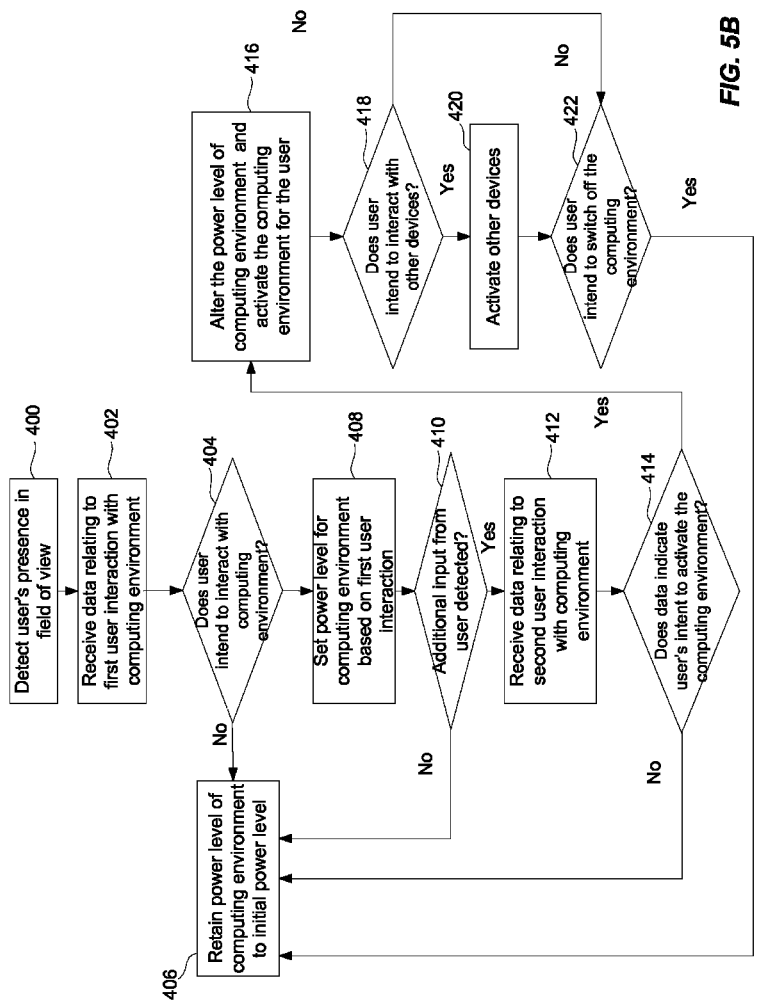

CONTROLLING POWER LEVELS OF ELECTRONIC DEVICES THROUGH USER INTERACTION

BACKGROUND

Various techniques are provided to enable the efficient power consumption and energy utilization of electronic devices. For example, a device may be switched on or off using a power switch to reduce the device's power consumption. Alternatively, an electronic device may be provided with a reduced power state during periods of time when the device is not actively used, for efficient energy utilization. For example, a multimedia system transmitting video, audio, and controls may enter into a standby mode, to reduce power consumption. Techniques to interact with powered electronics without the use of physical hardware have been developed.

SUMMARY

Disclosed herein is a method and system for intelligently controlling power to an electronic device through user interaction. The power level of an electronic device in a multimedia system is automatically altered when a user's presence in a field of view of the electronic device is detected. Additional user interaction with the electronic device in the form of a gesture or a voice input from the user is also detected. The power level of the electronic device is further altered based on the additional user interaction. In embodiments, the electronic device is activated for the user based on the additional user interaction.

In one embodiment, a computer implemented method for controlling power to a device is provided. The method includes receiving data relating to a first user interaction with a device in a multimedia system. The method includes determining if the first user interaction corresponds to a user's intent to interact with the device. A power level is then set for the device based on the first user interaction. Data is received relating to a second user interaction with the device. The second user interaction may correspond to a gesture or a voice input from the user. The power level of the device is further altered based on the second user interaction to activate the device for the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 5A and 5B illustrate an exemplary set of operations performed by the disclosed technology to automatically activate an electronic device in the multimedia system shown in FIG. 4, through user interaction.

DETAILED DESCRIPTION

Technology is disclosed by which the power levels of an electronic device may be automatically varied based on detecting a user's level of interaction with the electronic device. An image capture device captures data relating to a user's interaction with an electronic device in a multimedia system. In an embodiment, the electronic device is a multimedia console or a computing environment executing a game or other application in the multimedia system. In one set of operations performed by the disclosed technology, the power level of the computing environment is automatically altered based upon detecting a user's presence in a field of view of the computing environment. The image capture device detects additional user interaction with the computing environment in the form of a gesture or a voice input from the user. In another set of operations performed by the disclosed technology, the power level of the computing environment is further altered based on the additional user interaction and the computing environment is automatically activated for the user based on the altered power level.

In addition, technology is disclosed by which the intelligent power control of devices in a system may be achieved and the efficient device resource utilization and reduced device power consumption of devices may be performed in conformance with general energy conservation programs such as the Energy Star program or the One Watt initiative program, by reducing the standby power use of devices and the average power consumption of devices in a system.

Figure 1A:
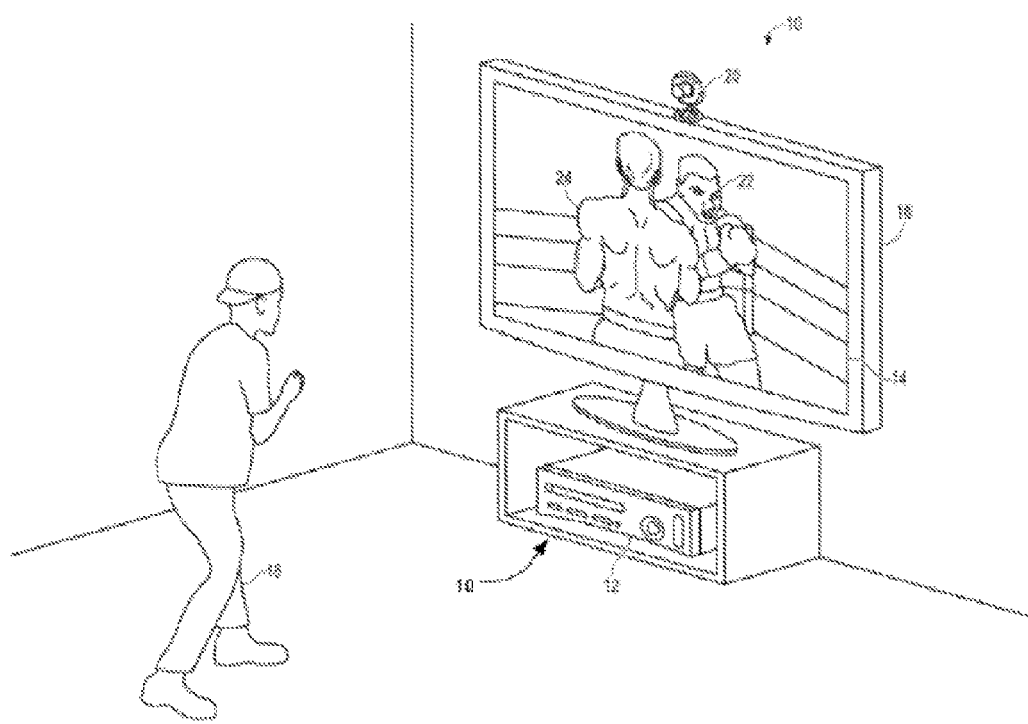
FIGS. 1A and 1B illustrate an example embodiment of a target recognition, analysis, and tracking system with a user playing a game.
Figure 1B:
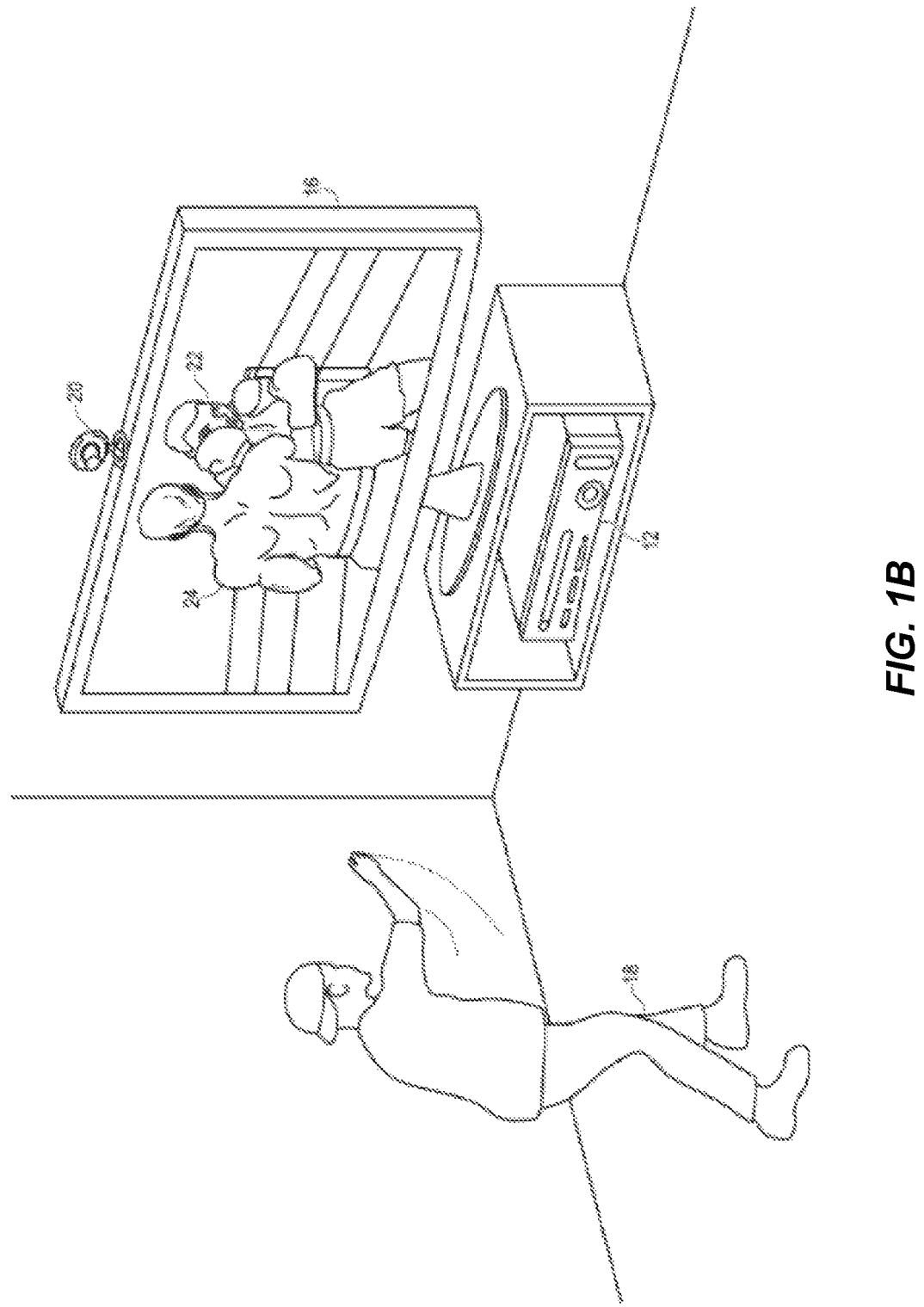
Figure 2:
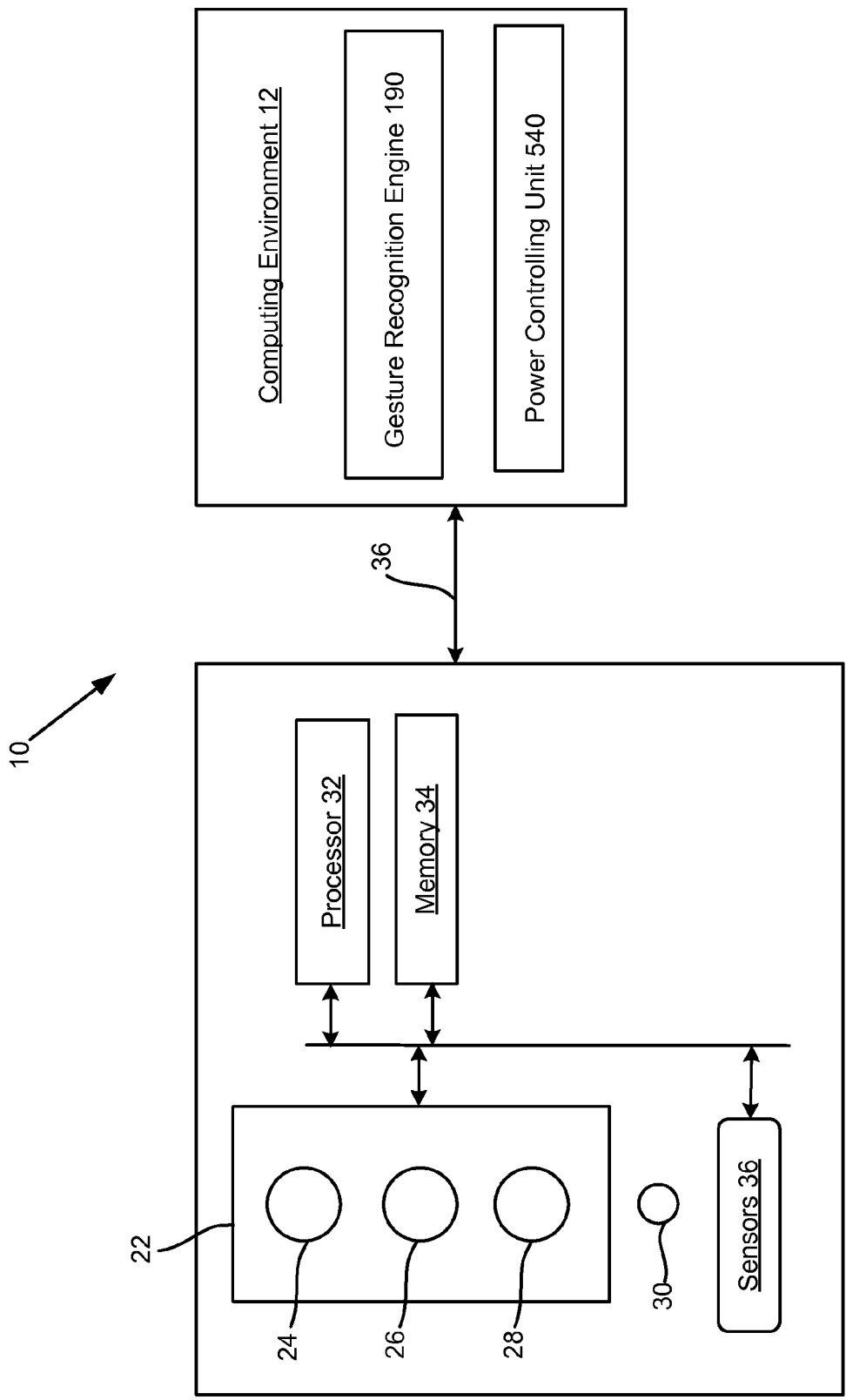
FIG. 2 illustrates an example embodiment of a capture device that may be used in a target recognition, analysis, and tracking system.

FIGS. 1A-2 illustrate a target recognition, analysis, and tracking system 10 which may be used by the disclosed technology to recognize, analyze, and/or track a human target such as a user 18. Embodiments of the target recognition, analysis, and tracking system 10 include a computing environment 12 for executing a gaming or other application, and an audiovisual device 16 for providing audio and visual representations from the gaming or other application. The system 10 further includes a capture device 20 for detecting gestures of a user captured by the device 20, which the computing environment receives and uses to control the gaming or other application. Each of these components is explained in greater detail below.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, as shown in FIG. 1B, the user 18 may throw a punch in physical space to cause the player avatar 24 to throw a punch in game space.

Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 24 in game space.

Other movements by the user 18 may also be interpreted as other controls or actions, such as controls to bob, weave, shuffle, block, jab, or throw a variety of different power punches. Moreover, as explained below, once the system determines that a gesture is one of a punch, bob, weave, shuffle, block, etc., additional qualitative aspects of the gesture in physical space may be determined. These qualitative aspects can affect how the gesture (or other audio or visual features) are shown in the game space as explained hereinafter.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging. According to another embodiment, the capture device 20 may include two or more physically separated cameras that may view a scene from different angles, to obtain visual stereo data that may be resolved to generate depth information.

In one embodiment, the capture device 22 may include one or more sensors 36. One or more of the sensors 36 may include passive sensors such as, for example, motion sensors, vibration sensors, electric field sensors or the like that can detect a user's presence in a field of view of the computing environment 12 by periodically scanning the field of view. The passive sensors may operate at a very low power level or at a standby power level to detect a user's presence in a field of view of the computing environment 12, thereby enabling the efficient power utilization of the components of the system. Upon detecting a user's presence, one or more of the sensors 36 may be activated to detect a user's intent to interact with the computing environment. In one embodiment, a user's intent to interact with the computing environment may be detected based on audio inputs such as a clapping sound from the user, lightweight limited vocabulary speech recognition, or lightweight image processing, such as, for example, a 1 HZ rate look for a user standing in front of the capture device or facing the capture device. Based upon the user interaction data, the power level of the computing environment 100 may be automatically varied and the computing environment 100 may be activated for the user. The operations performed by the disclosed technology are discussed in greater detail in FIGS. 5A and 5B.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, recognize user gestures and in response control an application such as a game or word processor. For example, as shown, in FIG. 2, the computing environment 12 may include a gesture recognizer engine 190. The gesture recognition engine 190 may be implemented as a software module that includes executable instructions to perform the operations of the disclosed technology. The gesture recognizer engine 190 may include a collection of gesture filters, each comprising information concerning a gesture that may be performed by the skeletal model (as the user moves). The data captured by the cameras 26, 28 and device 20 in the form of the skeletal model and movements associated with it may be compared to the gesture filters in the gesture recognizer engine 190 to identify when a user (as represented by the skeletal model) has performed one or more gestures. Those gestures may be associated with various controls of an application. Thus, the computing environment 12 may use the gesture recognizer engine 190 to interpret movements of the skeletal model and to control an application based on the movements. In an embodiment, the computing environment 12 may receive gesture information from the capture device 20 and the gesture recognizer engine 190 may identify gestures and gesture styles from this information. Further details relating to the gesture recognition engine for use with the present technology are set forth in copending patent application Ser. No. 12/642,589, filed Dec. 18, 2009, which is incorporated herein by reference in its entirety.

As further illustrated in FIG. 2, the computing environment may also include a power controlling unit 540. In one implementation, the power controlling unit 540 may be a software module that includes executable instructions to automatically control the power to the computing environment 12 through user interaction. In an embodiment, the power controlling unit 540 may analyze the gestures in the gesture recognition engine 190 to determine a user's intent to interact with the computing environment 12 and may automatically activate the computing environment 12 for the user. The operations performed by the power controlling unit 540 will be discussed in greater detail with respect to FIGS. 5 and 6 below.

Figure 3A:
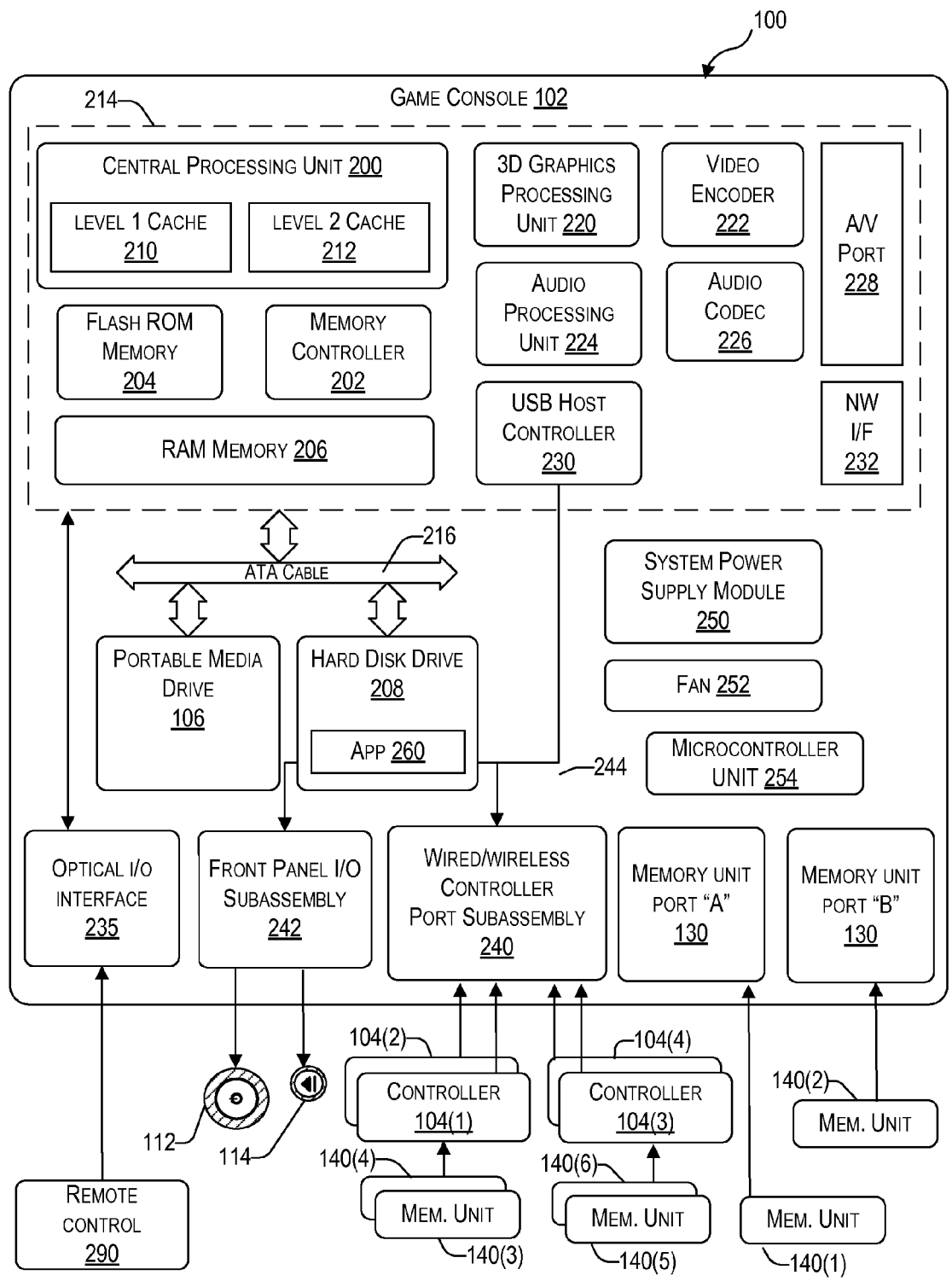
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more gestures in a target recognition, analysis, and tracking system. The computing environment such as the computing environment 12 described above with respect to FIGS. 1A-2 may be a multimedia console 102, such as a gaming console. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 3A shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 3A, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202. A system power supply module 250 provides power to the components of gaming system 100. A fan 252 cools the circuitry within console 102.

In an embodiment, console 102 also includes a microcontroller unit 254. The microcontroller unit 254 may be activated upon a physical activation of the console 102 by a user, such as for example, by a user pressing the power button 112 or the eject button 114 on the console 102. Upon activation, the microcontroller unit 254 may operate in a very low power state or in a standby power state to perform the intelligent power control of the various components of the console 102, in accordance with embodiments of the disclosed technology. For example, the microcontroller unit 254 may perform intelligent power control of the various components of the console 102 based on the type of functionality performed by the various components or the speed with which the various components typically operate. In another embodiment, the microcontroller unit 192 may also activate one or more of the components in the console 102 to a higher power level upon receiving a console device activation request, in the form of a timer, a remote request or an offline request by a user of the console 102. Or, the microcontroller unit 192 may receive a console device activation request in the form of, for example, a Local Area Network (LAN) ping, from a remote server to alter the power level for a component in the console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to audiovisual device 16 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community.

Figure 3B:
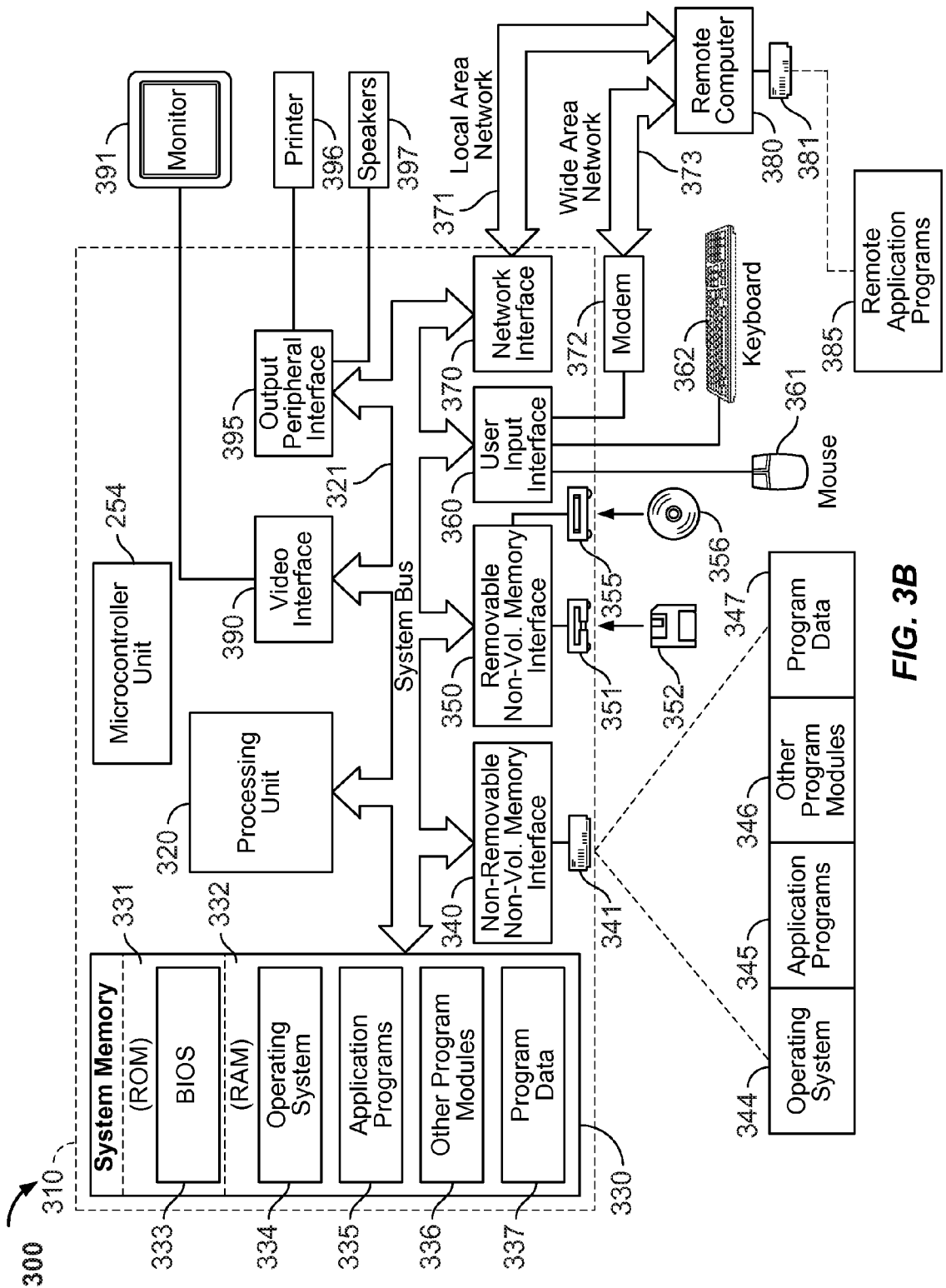
FIG. 3B illustrates another example embodiment of a computing environment that may be used to interpret one or more gestures in a target recognition, analysis, and tracking system.

FIG. 3B illustrates another example embodiment of a computing environment that may be used in the target recognition, analysis, and tracking system. FIG. 3B illustrates an example of a suitable computing system environment 300 such as a personal computer. With reference to FIG. 3B, an exemplary system for implementing the invention includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3B illustrates operating system 334, application programs 335, other program modules 336, and program data 337.

The computer 310 may also include other removable/non-removable, volatile/nonvolatile computer storage media. By way of example only, FIG. 3B illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3B, provide storage of computer readable instructions, data structures, program modules and other data for the computer 310. In FIG. 3B, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

In an embodiment, computer 310 may also include a microcontroller unit 254 as discussed in FIG. 3B to perform the intelligent power control of the various components of the computer 310. The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3B. The logical connections depicted in FIG. 3B include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3B illustrates remote application programs 385 as residing on memory device 381. It will be appreciated that the network connections shown are exemplary and other means of establishing a communications link between the computers may be used.

Figure 4:
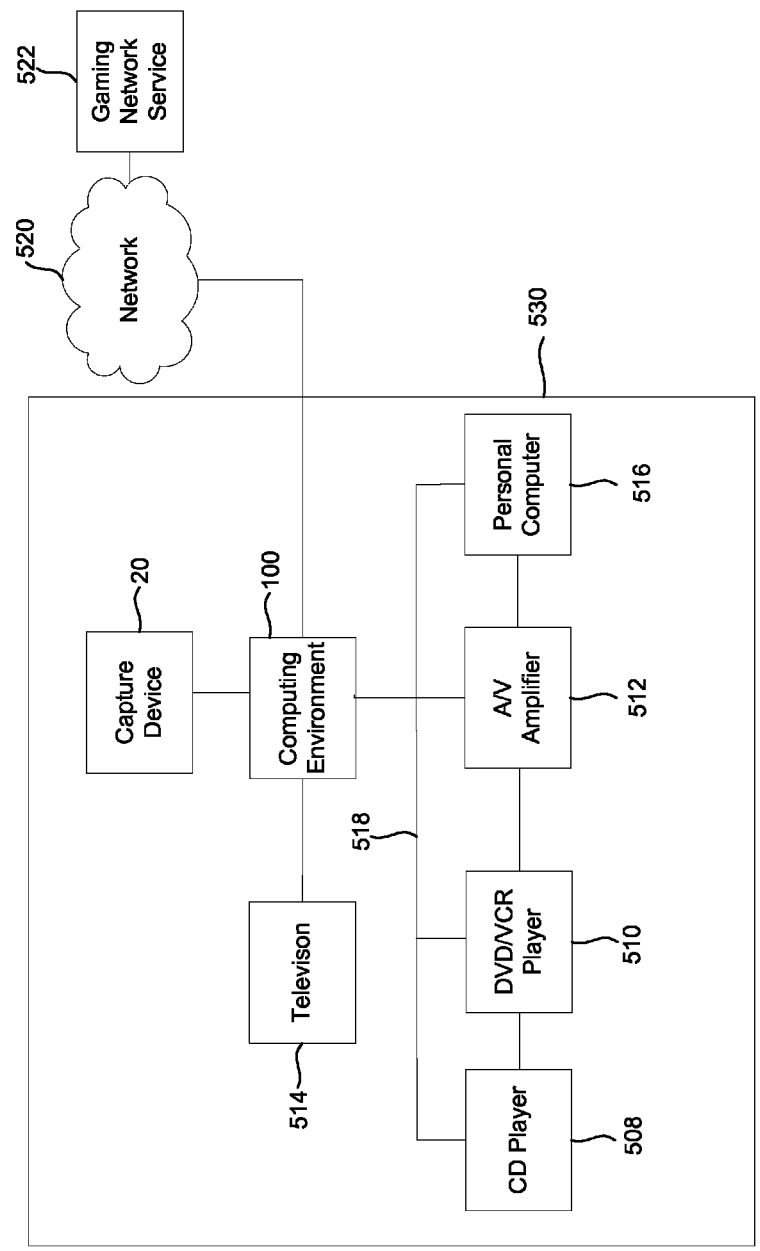
FIG. 4 illustrates an example embodiment of the operation of a computing environment in a multimedia system that may utilize the present technology.

FIG. 4 illustrates an example embodiment of the operation of a computing environment in a multimedia system that may utilize the present technology. The computing environment such as the computing environment 100, described above with respect to FIG. 3A, for example, may be a multimedia console for executing a game or other application in the multimedia system 530. In an embodiment, the computing environment 100 may further operate as an electronic device in a larger network community such as, the multimedia system 530. As illustrated, the multimedia system 530 may also include one or more devices, such as, for example, a compact disc (CD) player 508, a digital video disc/videocassette recorder (DVD/VCR) player 510, an audio/video (A/V) amplifier 512, television (TV) 514 and a personal computer (PC) 516. The devices (508-516) may be in communication with the computing environment 100 via peripheral controllers 142(1)-142(2) (shown in FIG. 3A) in the computing environment 100 or via a communication link 518, which may include a wired connection including, for example, a USB connection, a Firewire connection, an Ethernet cable connection, or the like and/or a wireless connection such as a wireless 802.11b, g, a, or n connection. The computing environment 100 may also include an audio/video processing pipeline that outputs data to an A/V (audio/video) port 140 (shown in FIG. 3A) for transmission to the TV 514 or the PC 516. The A/V (audio/video) port, such as port, 140 may be configured for content-secured digital communication using A/V interfacing cables, such as, for example, A/V cables suitable for coupling to a High Definition Multimedia Interface "HDMI" port on the TV 514 or the display monitor on the PC 516.

A capture device 20 may define an additional input device for the computing environment 100. The capture device 20 may include an image camera component such as, as discussed with respect to FIG. 2, to capture the depth image of a user entering a field of view of the computing environment 100. It will be appreciated that the interconnections between the various devices (508-516), the computing environment 100 and the capture device 20 in the multimedia system 530 are exemplary and other means of establishing a communications link between the devices (508-516) may be used according to the requirements of the multimedia system 530. In an embodiment, system 530 may connect to a gaming network service 522 via a network 520 to enable interaction with a user on other systems and storage and retrieval of user data therefrom.

Power control technology is implemented by the disclosed technology where the capture device 20 initially detects data relating to a user's intent to interact with the computing environment 100 and communicates the user interaction data to the computing environment 100. Based on the user interaction data received by the capture device 20, the power level of the computing environment 100 is automatically varied and the computing environment 100 is activated for the user. In an embodiment, a processing module in the computing environment 100 (such as, for example, the CPU 101, shown in FIG. 3A) may execute instructions for performing the operations for activating the computing environment 100 for the user. Specifically, the processing module may include instructions for receiving the user interaction data from the capture device 20 and setting a power level for the capture device 20 and the computing environment 100 based on the user interaction data. The processing module in the computing environment 100 may also include instructions for receiving additional user interaction data from the capture device 20 and altering the power level of the computing environment 100 based on the additional user interaction data. The processing module may further include instructions for activating the computing environment 100 based on the altered power level. In an alternate set of operations, and as will be discussed in greater detail with respect to FIG. 6 below, the processing module in the computing environment 100 may also execute instructions to activate one or more of the electronic devices (508-516) in the multimedia system 530 for the user, after activating the computing environment 100.

Communication between the devices in the multimedia system 530 to perform the operations of the disclosed technology may in one implementation be performed using High Definition Multimedia Interface (HDMI), which is a compact audio/video interface for transmitting uncompressed digital data between electronic devices. In an embodiment, HDMI is used to connect the digital A/V sources such as the DVD/VCR player 510, the A/V amplifier 512, the capture device 20 and the computing environment 100 to compatible digital audio devices such as the TV 514 or the PC 516. As will be appreciated, HDMI supports, on a single cable, any TV or PC video format, including standard, enhanced, and high-definition video, up to 8 channels of digital audio and a Consumer Electronics Control (CEC) connection. The Consumer Electronics Control (CEC) connection enables the HDMI devices to control each other when necessary and allows a user to operate multiple devices at the same time.

Figure 5A:
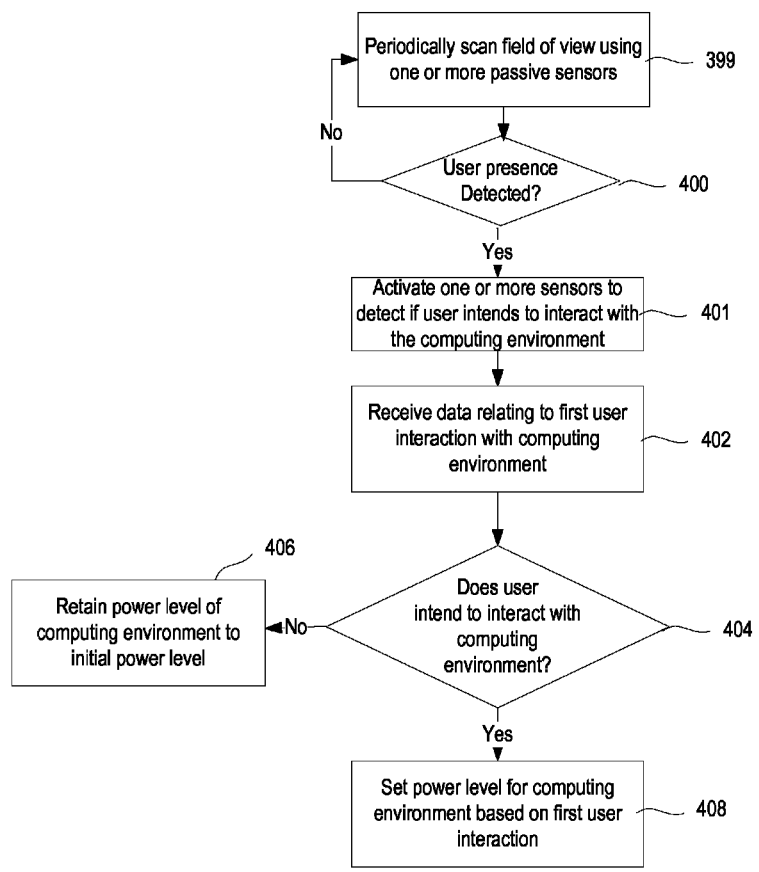

FIG. 5A illustrates an exemplary set of operations performed by the disclosed technology to automatically activate an electronic device in the multimedia system 530 shown in FIG. 4, through user interaction. In an embodiment, the electronic device activated for the user is the computing environment 100. In step 399, the field of view of the computing environment is periodically scanned to detect a user's presence in the field of view. As discussed in FIG. 2, one or more passive sensors in the plurality of sensors 36 operating at a very low power level or at a standby power level may periodically scan the field of view of the computing environment to detect a user's presence in the field of view. In step 400, a check is made to determine if a user's presence was detected. If a user's presence was not detected, then the sensors may continue to periodically scan the field of view to detect a user's presence as discussed in step 399. If a user's presence was detected, then in step 401 one of more of the sensors 36 may be activated to detect a user's intent to interact with the computing environment. In step 402, data relating to a first user interaction with the computing environment is received. In step 404, a check is made to determine if the data relating to the first user interaction corresponds to a user's intent to interact with the computing environment. A user's intent to interact with the computing environment may be determined based on a variety of factors. In one embodiment, a user's intent to interact with the computing environment may be detected based on audio inputs such as a clapping sound from the user, lightweight limited vocabulary speech recognition, or based on lightweight image processing performed by the capture device, such as, for example, a 1 HZ rate look for a user standing in front of the capture device or facing the capture device. If it is determined in step 404, that the user intends to interact with the computing environment, then the power level of the computing environment is set to a particular level to enable the user's interaction with the computing environment. If at step 404, it is determined that the user does not intend to interact with the computing environment, then the power level of the computing environment is retained at the original power level. The operations performed by the disclosed technology to perform the intelligent power control of the computing environment and other devices of the system 530 are described in greater detail in FIGS. 5B and 6.

FIG. 5B illustrates an exemplary set of operations performed by the disclosed technology to automatically activate an electronic device in the multimedia system 530 shown in FIG. 4, through user interaction in greater detail. In an embodiment, the electronic device activated for the user is the computing environment 100. In step 400, a user's presence in a field of view of the computing environment 100 is detected by one or more sensors 36 in the capture device 20 as discussed in FIG. 5A, and the user interaction data is communicated to the computing environment 100. Specifically, in step 402, data relating to a first user interaction is received by the computing environment 100. In decision step 404, a check is made to determine if the first user interaction corresponds to a user's intent to interact with the computing environment 100. A variety of factors may be used to determine whether a user intends to interact with an electronic device, such as, for example, the computing environment 100. For example, a user's movement towards the field of view of the computing environment 100 may indicate a higher probability of the user's intent to interact with the computing environment 100. On the other hand, the probability of a user's intent to interact with the computing environment 100 may be low if the user is generally in one location and appears to be very still. Or, for example, a user's quick movement across the field of view of the computing environment 100 or a user's movement away from the field of view may be indicative of a user's intent not to interact with the computing environment 100. In addition, and as discussed in FIG. 5A, a user's intent to interact with the computing environment may also be detected based on audio inputs such as a clapping sound from the user, lightweight limited vocabulary speech recognition, or based on lightweight image processing performed by the capture device, such as, for example, a 1 HZ rate look for a user standing in front of the capture device or facing the capture device.

If decision step 404 is true, that is, if the first user interaction corresponds to a user's intent to interact with the computing environment 100, then step 408 is performed wherein the power level of the capture device 20 and the computing environment 100 is set to a particular power level. In one implementation, the power level of the capture device 20 and the computing environment 100 may be increased to an intermediate power level from an initial power level. It is to be appreciated that the capture device 20 and the computing environment 100 may be operating at an initial power level prior to receiving user interaction data. For example, the initial power level of the capture device 20 and the computing environment 100 may be set to be in a range of about 0 watts to about 10 watts. Upon detection of a user's intent to interact with the computing environment 100, the initial power level of the capture device 20 and the computing environment 100 may be automatically increased to an intermediate power level. For example, the intermediate power level may be set to be in a range of about 10 watts to about 30 watts. Observe that the setting of power levels of the capture device 20 and the computing environment 100 to an initial power level prior to receiving user interaction data provides for the efficient energy utilization of the devices 20, 100 in the multimedia system 530. If decision step 404 is false, that is, if it is determined that the user does not intend to interact with the computing environment 100, step 406 is performed wherein the power level of the capture device 20 and the computing environment 100 is retained at the initial power level.

Processing continues to decision step 410 where a check is made to determine if a user intends to further interact with the computing environment 100. If decision step 410 is false, that is, if no additional input is detected from the user, step 406 is performed wherein the power level of the capture device 20 and the computing environment 100 is retained at the initial power level. If decision step 410 is true, then step 412 is performed, wherein data relating to a second user interaction with the computing environment 100 is received. The second user interaction may include, for example, a gesture or additional voice input from the user. For example, a user may raise his or her arm and wave at the capture device 20 to indicate intent to further interact with the computing environment 100. Or, the user may utter a voice command such as "start" or "ready" or "turn on" to indicate intent to engage with the computing environment 100. The voice input may include spoken words, whistling, shouts and other utterances. Non-vocal sounds such as clapping the hands may also be detected by the capture device 20. For example, a microphone coupled to the capture device 20 may optionally be used to detect a direction from which a sound is detected and correlate it with a detected location of the user to provide an even more reliable measure of the probability that the user intends to engage with the computing environment 100.

In addition, the presence of voice data may be correlated with an increased probability that a user intends to engage with an electronic device. Moreover, the volume or loudness of the voice data may be correlated with an increased probability that a user intends to engage with a device. Also, speech can be detected so that commands such as "turn on device" "start" or "ready" indicate intent to engage with the device. A user's intent to engage with a device may also include detecting speech which indicates intent to engage with the device and/or detecting a voice volume which indicates intent to engage with the device.

At step 414 a check is made to determine if the data relating to the second user interaction indicates a user's intent to activate the computing environment 100. If decision step 414 is true, then step 416 is performed to alter the power level of the computing environment 100 based on the second user interaction and activate the computing environment for the user. For example, the power level of the computing environment 100 may be altered to an activation power level from the intermediate power level. In one implementation, the activation power level for the computing environment 100 may be in the range of about 30 watts to about 50 watts. For example, the activation of the computing environment 100 may include providing an audio output or a video display associated with the computing environment 100 to the user. In step 418, a check is made to determine if the user's intends to interact with additional devices in the multimedia system 530. If step 418 is true, then step 420 is performed to activate the additional devices for the user. The operations performed by the disclosed technology to activate additional devices for the user is described in greater detail in FIG. 6 below.

After the user has completed use of the computing environment, the user may wish to switch off the unit. In step 422, a check is performed to determine if the user intends to switch off the computing environment 100. For example, a gesture or a voice input may be received from the user, indicative of the user's intent to stop interacting with the computing environment 100. If decision step 422 is true, then step 406 is performed wherein the power level of the computing environment 100 and the capture device 20 is altered to the initial power level. If step 422 is false, that is if the user does not intend to stop interacting with the computing environment 100, then control passes back to step 416 where the computing environment 100 remains activated for the user. It is to be appreciated that the operations (402-422) discussed above may be performed by the processing module in the computing environment 100, in one embodiment. In alternative embodiments, the operations may be performed by alternative processors such as processor 32 in the capture device 20 or by the power controlling unit 540 in the computing environment 12 as illustrated in FIG. 2.

Figure 6:
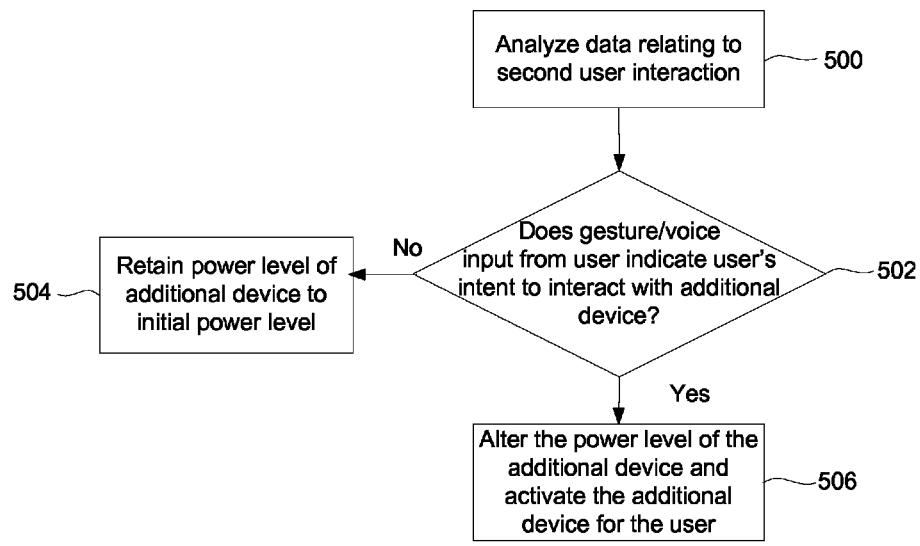
FIG. 6 depicts an example method for activating one or more additional devices in the multimedia system shown in FIG. 4 through user interaction.

FIG. 6 depicts an example method for activating one or more additional devices in the multimedia system shown in FIG. 4 through user interaction. In an embodiment, the processing module in the computing environment 100 may also execute instructions to activate one or more of the electronic devices (508-516) in the multimedia system 530 for the user, after activating the computing environment 100. For example, the processing module in the computing environment 100 may include instructions to analyze if the data relating to the second user interaction received from the capture device 20 indicates a user's intent to activate one or more additional devices (508-516) in the system 530, in addition to the computing environment 100. Alternatively, the processing module in the computing environment 100 may receive data relating to additional user interaction from the capture device 20, wherein the additional user interaction relates to a user's intent to activate another device in the system 530. Specifically, the processing module in the computing environment 100 may include instructions to further analyze the gesture or the voice input received from the user. The exemplary operations (500-506) performed by the processing module in the computing environment 100 to activate one or more additional devices (508-516) in the multimedia system 530 are discussed below.

FIG. 6 illustrates one example of the determination made at step 418 in FIG. 5. Initially, at step 500, data relating to the second user interaction is analyzed to determine if the user intends to interact with one or more of the additional devices (508-516) in the system 530. In decision step 502, a check is made to determine if the gesture and/or the voice input from the user is indicative of the user's intent to interact with an additional device in the system 530. For example, the user may utter a command such as "turn on TV" to indicate intent to engage with the TV 312 in the multimedia system 530. If decision step 502 is true, step 506 is performed to alter the power level of the additional device with which the user intends to interact with and activates the additional device for the user. If decision step 502 is false, that is, if it is determined that the user does not intent to interact with an additional device, step 504 is performed, wherein the power level of the additional device is retained at the initial power level. It may be appreciated that the activation power level of certain devices such as the TV 514, the CD player 508 and the DVD/VCR player 510 in the system 530 may be typically lower than for example, the activation power level associated with the computing environment 100 in the system 530. Accordingly, the disclosed technology provides for the intelligent power control of the devices (508-516) in the multimedia system 530 based on the energy utilization and the power consumption requirements of the devices (508-516).

Figure 7:
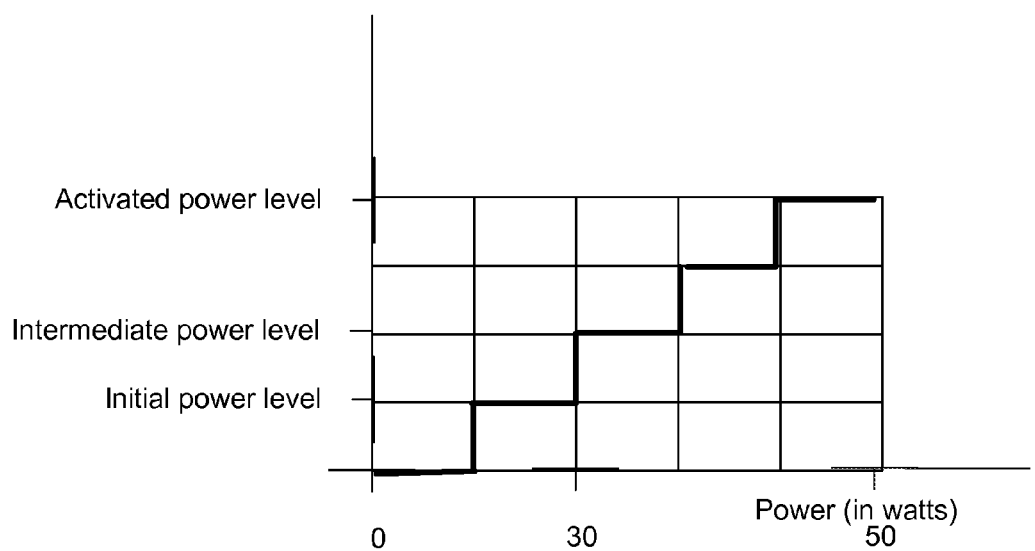
FIG. 7 is a graphical illustration of a power level progression associated with a device, in accordance with one embodiment of the invention.

In an embodiment, the processing module of the computing environment 100 may also include instructions for displaying a power level progression corresponding to a certain power level setting associated with the computing environment 100 or one or more of the devices (508-516) in the multimedia system 530. For example, a power level progression associated with devices such as the computing environment 100, the TV 514 or the PC 516 may include displaying certain audio/video controls that may correspond to a certain power level setting associated with the device such as a blank screen or a screen saver display to the user, when the device is set to an intermediate power level. FIG. 7 is a graphical illustration of a power level progression associated with a device, in accordance with one embodiment of the invention. In the illustrated example, the y-axis of graph illustrates various power levels that may be assigned to a device, in one embodiment. The x-axis of the graph illustrates exemplary values of the power (in watts) for the device for a corresponding power level assigned to the device.

In certain situations, a user may also desire to interact with the computing environment 100 and the other devices (508-516) in the multimedia system 530 via the network 520 shown in FIG. 4. Accordingly, the computing environment 100 in the multimedia system 530 may also receive a voice input from a user connected to the gaming network service 522, via the network 520, indicating intent to interact with the computing environment 100. The power level of the computing environment 100 may be altered and the computing environment 100 may be activated for the user even when the user is outside the field of view of the computing environment 100. Additionally, the computing environment may also alter the power levels of one or more of the devices (508-516) based on the voice input from the user.

Figure 8:
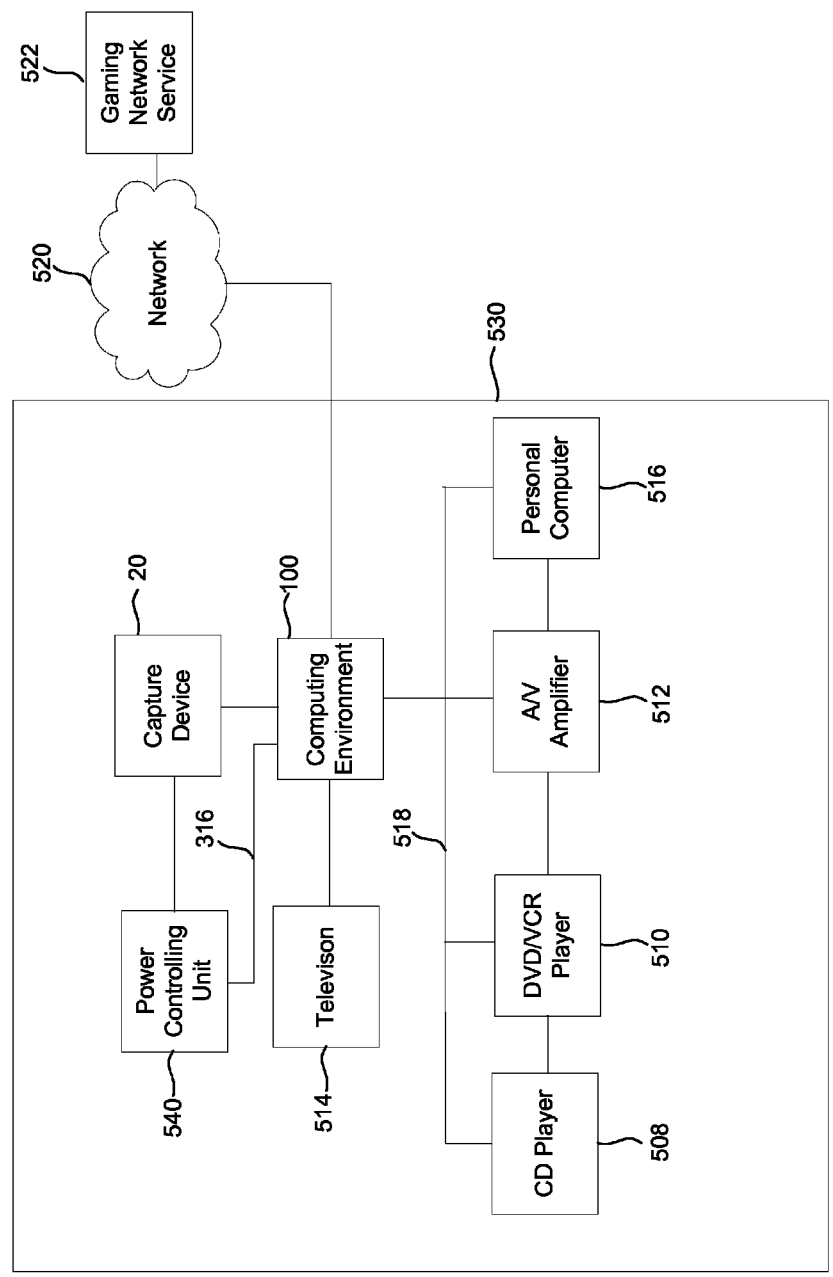
FIG. 8 illustrates an example embodiment of a power controlling unit in the multimedia system shown in FIG. 4 that may utilize the present technology.

FIG. 8 illustrates an example embodiment of the disclosed technology where a separate a power controlling unit is used in the multimedia system shown in FIG. 4. The power controlling unit 540 may activate the computing environment 100 and one or more of the devices (508-516) in the multimedia system 530 by assigning varying power levels to the devices based on determining a user's level of interaction with the devices. As illustrated in FIG. 8, the power controlling unit 540 may be in communication with the capture device 20 and the computing environment 100, via a communication link 316, in an embodiment. However, it is to be appreciated that the power controlling unit 540 may be in communication with any one or a combination of the devices (508-516) illustrated in the system 530. As discussed above, the communication link 518 may be a wired connection including, for example, a USB connection, a Firewire connection, an Ethernet cable connection, or the like and/or a wireless connection such as a wireless 802.11b, g, a, or n connection. Furthermore, the power controlling unit 540 may be a separate component in communication with the capture device 20 and the computing environment 100 via the communication link 518 or it may be a component integrated into the computing environment 100 as shown in FIG. 2.

The power controlling unit 540 may also include a processor (not shown) that may be in operative communication with the capture device 20 and the computing environment 100 in the multimedia system 530. The processor may include a standardized processor, a specialized processor, a microprocessor, or the like that may execute the instructions for receiving data related to a user interaction with the computing environment 100, altering the power level of the computing environment 100 based on the user interaction and activating the computing environment 100 based on determining a user's level of interaction with the computing environment 100. The power controlling unit 540 may also activate one or more of the devices (508-516) in the multimedia system 530 based on the activation of the computing environment 100. The power controlling unit 540 may include a memory that may store the instructions that may be executed by the processor. According to an example embodiment, the memory may include random access memory (RAM), read only memory (ROM), cache, Flash memory, a hard disk, or any other suitable storage component.

The disclosed technology has several advantages including the ability to automatically activate an electronic device based on determining a user's intent to interact with the device and without the user's physical interaction with the device, resulting in enhanced user experience. In addition, the disclosed technology of automatically activating a set of devices based on user intent results in efficient device resource utilization and reduced power consumption, thereby resulting in significant cost savings to the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer implemented method for controlling power to one or more devices in a multimedia system comprising:
   capturing image data of a field of view of an image capture device of the multimedia system;
   detecting a presence of a user in the field of view of the image capture device in the captured image data by a processor;
   identifying by the processor a first user interaction with a first device in the multimedia system in the image data, the first user interaction comprising a voice input from the user;
   determining by the processor if the first user interaction corresponds to a user intent to interact with the first device in the multimedia system by correlating a volume of the voice input with an increased probability that the user intends to engage with the first device;
   setting a first power level for the first device based on the first user interaction by the processor;
   capturing image data by the image capture device of a second user interaction with the first device of the multimedia system in the image data, the second user interaction including a gesture;
   altering by the processor the first power level for the first device based on the second user interaction, to generate a second power level for the first device;
   activating by the processor the first device based on the second power level;
   determining by the processor whether the second user interaction corresponds to a user intent to interact with at least one additional device in the multimedia system by the processor analyzing the captured data of the second user interaction;
   responsive to determining by the processor the second user interaction corresponds to the user intent to interact with the at least one additional device, altering a power level of the at least one additional device to an altered power level by the processor based on the second user interaction;
   and activating the at least one additional device for the user by the processor, based on the altered power level for the at least one additional device.

2. The computer implemented method of claim 1, wherein the first device is a computing environment in the multimedia system.

3. The computer implemented method of claim 1, wherein setting the first power level comprises displaying a power level progression associated with the first device.

4. The computer implemented method of claim 1, wherein activating by the processor the first device based on the second power level comprises displaying at least one of an audio output or a video display associated with the first device.

5. The computer implemented method of claim 1, wherein the second user interaction further comprises a voice input from the user.

6. The computer implemented method of claim 1, wherein the data of the second user interaction with the first device includes a sound input.

7. The computer implemented method of claim 1, wherein the second user interaction comprises a voice input from the user, and a volume of the voice input is correlated by the processor with an increased probability that the user intends to engage with the at least one additional device.

8. A multimedia system, comprising:
   an image capture device, wherein the capture device detects a presence of a user in a field of view of the image capture device;
   and a computing environment in communication with the image capture device and one or more devices in the multimedia system, wherein the computing environment includes a processing module that includes instructions to:
   receive data relating to a first user interaction including a gesture from the image capture device:
   set a first power level for the computing environment based on the first user interaction comprising a voice input from the user;
   determine a user intent to interact with a computing device by correlating a volume of the voice input with an increased probability that the user intends to engage with the computing environment;
   receive image data relating to a second user interaction including a gesture from the image capture device;
   alter the first power level for the computing environment based on the second user interaction, to generate a second power level for the computing environment;
   activate the computing environment for the user, based on the second power level;
   analyze the image data of the second user interaction to determine whether a user's intent to interact with at least one additional device in the multimedia system exists;
   responsive to determining the user's intent to interact with the at least one additional device exists, alter a power level of the at least one additional device to an altered power level based on the second user interaction;
   and activate the at least one additional device for the user, based on the altered power level for the at least one additional device.

9. The multimedia system of claim 8, wherein the one or more devices in the multimedia system comprise at least one of a compact disc (CD) player, a digital video disc/videocassette recorder (DVD/VCR) player, an audio/video (A/V) amplifier, a television (TV) and a personal computer (PC).

10. The multimedia system of claim 8, wherein the processing module includes instructions to display at least one of an audio output or a video display associated with the computing environment to the user, based on the second power level.

11. The multimedia system of claim 8, wherein the processing module includes instructions to display a power level progression associated with the computing environment to the user.

12. The multimedia system of claim 8, wherein the first user interaction corresponds to a user intent to interact with the computing environment.

13. The multimedia system of claim 8, wherein the second user interaction comprises a voice input from the user, and a volume of the voice input is correlated by the computing environment with an increased probability that the user intends to engage with the second device.

14. One or more computer readable memory storage devices for controlling power to a computing environment in a multimedia system comprising processor executable instructions to:
   receive data relating to a first user interaction with the computing environment, the first user interaction comprising a voice input from the user;
   determine whether the data relating to the first user interaction indicates a user intent to interact with the computing environment by correlating a volume of the voice input with an increased probability that the user intends to engage with the computing environment;
   set a first power level for the computing environment responsive to the first user interaction indicating the user intent to interact with the computing environment;
   display a power level progression associated with the computing environment;
   receive image data relating to a second user interaction with the computing environment, the second user interaction including a gesture;
   alter the first power level for the computing environment based on the second user interaction, to generate a second power level;
   activate the computing environment, based on the second power level;
   determine whether the second user interaction indicates a user intent to interact with at least one additional device in the multimedia system by analyzing the image data of the second user interaction;
   responsive to determining the second user interaction indicates the user intent to interact with the at least one additional device, alter a power level of the at least one additional device based to an altered power level based on the second user interaction; and activate the at least one additional device for the user, based on the altered power level for the at least one additional device.

15. The one or more computer readable memory storage devices of claim 14, wherein the executable instructions to activate the computing environment comprise executable instructions to output at least one of an audio output or a video display associated with the computing environment.

16. The one or more computer readable memory storage devices of claim 14 further comprising executable instructions for identifying voice input from the user, and correlating a volume of the voice input with an increased probability that the user intends to engage with the second device.

* * * * *